E. J. BOUCHARD.
PIPE COUPLING.
APPLICATION FILED JAN. 15, 1914.

1,137,113.

Patented Apr. 27, 1915.

Witnesses:
Ambrose E. Sullivan
Leonard A. Powell

Inventor:
Everett J. Bouchard

UNITED STATES PATENT OFFICE.

EVERETT J. BOUCHARD, OF WARE, MASSACHUSETTS.

PIPE-COUPLING.

1,137,113.

Specification of Letters Patent.

Patented Apr. 27, 1915.

Application filed January 15, 1914. Serial No. 812,230.

*To all whom it may concern:*

Be it known that I, EVERETT J. BOUCHARD, a citizen of the United States, residing at Ware, in the county of Hampshire and State of Massachusetts, have invented new and useful Improvements in Pipe-Couplings, of which the following is a specification.

This invention relates to improvements in pipe couplings and has for its object to provide a coupling constructed in such a manner that the cost of manufacture will be greatly reduced owing to the small number of finished surfaces contained therein.

Still another object of the invention is to provide a metallic seat ring which is inserted between the adjoining faces of the members constituting said coupling to make the joint tight or nonleakable.

While still another object of the invention is to provide a seat ring which may be secured to one of the coupling members to retain the same in place when the members are separated one from the other.

The invention consists in the combination and arrangement of parts whereby the above objects and certain other objects hereinafter appearing may be attained, as set forth in the following specification and particularly pointed out in the claim.

Figure 1:
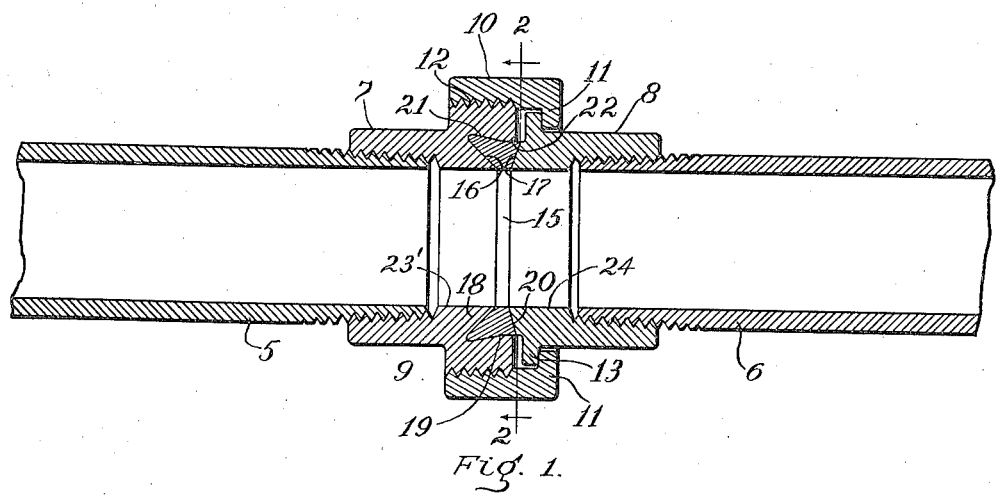
Figure 2:
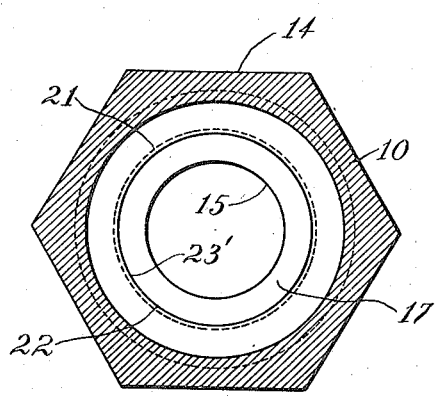
Figure 3:
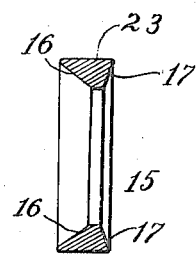

Referring to the drawings: Figure 1 is a longitudinal sectional elevation of a pipe coupling embodying my invention. Fig. 2 is a section taken on line 2—2 of Fig. 1. Fig. 3 is a detail transfer section of the seat ring as it appears before it is attached to one of the members of the coupling.

Like numerals refer to like parts throughout the several views of the drawings.

In the drawings, 5 and 6 illustrate sections of pipe which are preferably screw-threaded at their ends and engage coupling sections 7 and 8 respectively of a pipe coupling 9. The coupling sections 7 and 8 are secured together by any of the well-known means, one of which is herein shown and consists of a ring 10, said ring having a reduced portion 11 constituting a flange adjacent one end thereof, while the opposite end of said ring is provided with internal screw-threads 12. The flange or reduced portion 11 of said ring is adapted to engage the face of a flange 13 formed upon the member 8, while the screw-threads 12 are adapted to engage corresponding threads cut or formed upon the outer face at one end of the section 7, while to assist in turning said ring to draw the members together the outer rim or periphery 14 is made preferably hexagonal in form.

To prevent leakage between the adjoining faces of the coupling sections 7 and 8, I have preferably provided a gasket or seat ring 15 having end faces 16 and 17 inclined outwardly and away from each other, the face 16 engaging a correspondingly inclined or complementary face 18 on the section 7 at the bottom of an interior annular recess 19 formed therein, while the face 17 engages a correspondingly inclined face 20 at the end of the section 8, thus as said sections 7 and 8 are drawn together by the ring 10 said inclined faces will be firmly wedged one against the other to close said joint.

To prevent the seat ring 15 from becoming disengaged from the section 7, when the two sections of said coupling are separated, the recess 19 is of larger diameter at the bottom 21 than it is at the outer end thereof 22 by reason of its outer side being inclined outwardly toward the bottom of said recess, the same being preferably formed by an expansible end mill which is gradually expanded during the feeding movement thereof. The preferred method of forming the recess 19 is to form a portion of the outer wall thereof from the outer end 22 cylindrical for substantially half of its depth, but from the end of said cylindrical portion said wall inclines outwardly toward the bottom 21 thereof.

The seat ring 15 is made with its outer face 23 cylindrical and with its diameter equal to the diameter of the end 22 of said recess 19 and with the face 16 of said ring inclined at a slightly greater angle than is the bottom face 18 of the recess 19. This seat ring however is made of material relatively softer than the material constituting the sections 7 and 8 and as the same is pressed into said recess it is permitted to expand to conform with the shape of said recess in which form it remains after the pressure of the inserting tool has been removed, while the inside diameter of said seat ring coincides with the inside diameters of the sections 7 and 8 after said ring has been expanded as above stated. The inner face of the seat ring 15 is preferably parallel with the outer face 23, said inner face being so formed that it will aline with the inner surfaces of the coupling sections 7 and 8.

The cylindrical portion of the outer wall of said interior annular recess 19 has been provided for the purpose of preventing the ring 15 from tipping or, in other words, to insure the inner face of said ring remaining cylindrical or in alinement with the inner cylindrical faces of the coupling sections 7 and 8 during the expansion of said ring.

In all of the pipe couplings in general use little attention is given to the interior thereof, the usual custom being to make the inside diameter thereof substantially equal to the inside diameter of the threads formed at the ends of said sections 7 and 8. This has been found objectionable for several reasons, one reason being that pockets are formed between the ends of the pipe sections 5 and 6 which catch more or less grease or the like. To overcome this disadvantage the inside diameter of the sections 7 and 8 at 23' and 24 respectively are made equal to the inside diameters of the standard pipes 5 and 6 for which said coupling is adapted, thus forming practically an uninterrupted surface from one pipe section to the other, with the exception of a very small space at the ends of the threaded portions of said sections 7 and 8 which are unavoidable.

The most important advantage gained by the above described construction resides in the fact that the inside diameters of the adjoining ends of the sections 7 and 8 will be of the same diameters and also, as hereinbefore stated, the same as the inside diameters of the pipes connected with said sections, thereby providing a surface which may be scaled when desired to determine the inside diameters of the pipes to be connected thereto. Furthermore by the use of a seat ring formed in the manner described a great amount of work will be eliminated in the manufacturing of the coupling, as practically the only faces which require finishing are the faces 16 and 17 of the seat ring and 18 and 20 of the members 7 and 8 respectively, said faces being capable of properly alining the sections 7 and 8 of said coupling.

Having thus described my invention what I claim and desire by Letters Patent to secure is:

A pipe coupling comprising a pair of coupling sections, means to secure said sections together, one of said sections having an interior annular recess formed at the end thereof adjacent the other of said sections, the bottom of said recess inclining outwardly away from said end, a portion of the outer wall of said recess being cylindrical, the remaining portion of said outer wall inclining outwardly toward the bottom of said recess, the end adjacent to said recess of the other section of said coupling being inclined outwardly and away from said recess, and a seat ring expanded into said annular recess, the outer face thereof conforming with the cylindrical portion of said wall and the portion thereof which inclines outwardly toward the bottom of said recess, the end of said ring conforming to the inclined bottom of said recess, said ring also being provided with an inclined end face adapted to conform to the adjacent inclined end face of the other coupling section, the inner wall of said ring alining with the interiors of said coupling sections.

In testimony whereof I have hereunto set my hand in presence of two subscribing witnesses.

EVERETT J. BOUCHARD.

Witnesses:
　CHARLES S. GOODING,
　SYDNEY E. TAFT.